UNITED STATES PATENT OFFICE.

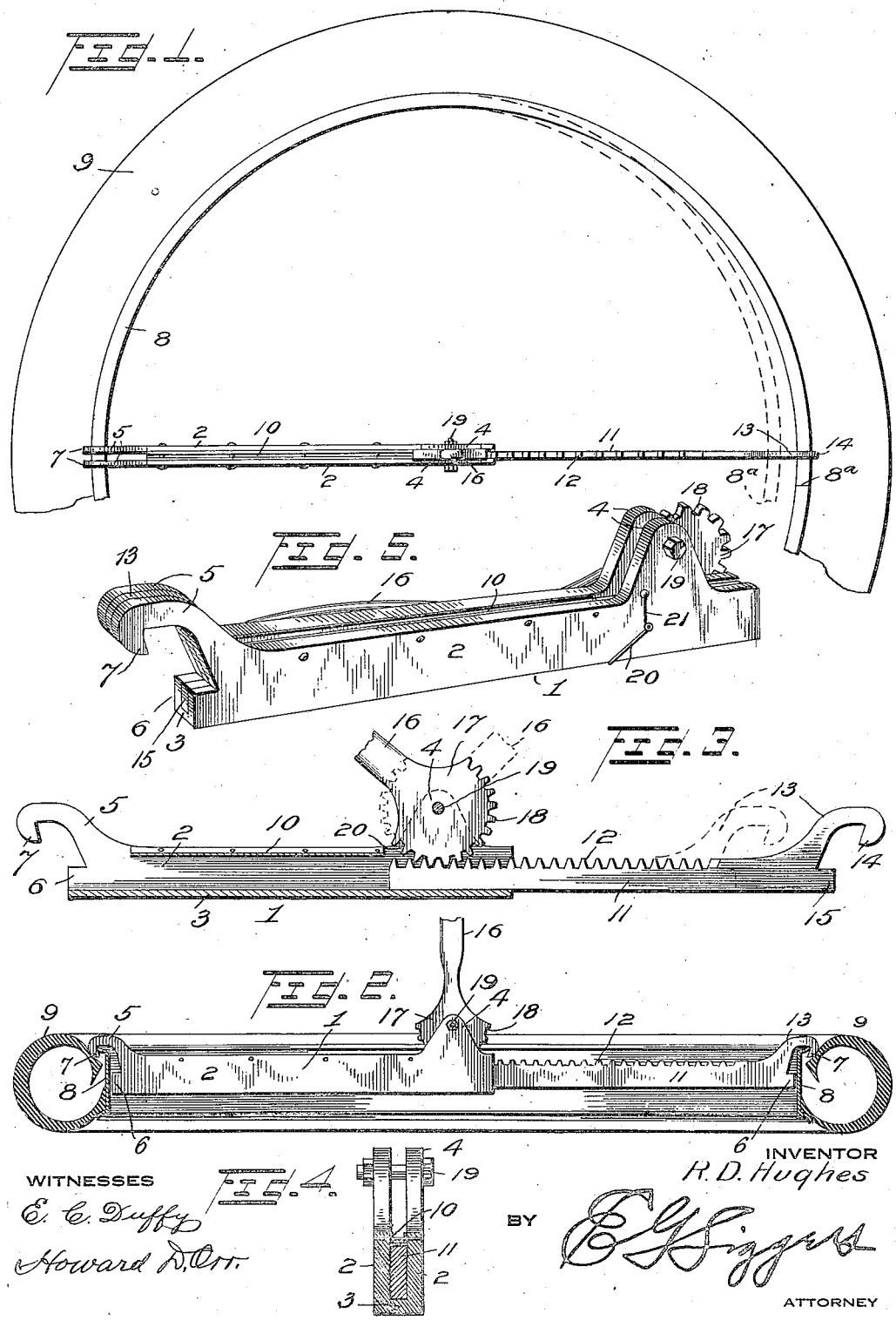

ROBERT D. HUGHES, OF LYNCHBURG, VIRGINIA.

TOOL FOR HANDLING DEMOUNTABLE RIMS.

1,414,879. Specification of Letters Patent. Patented May 2, 1922.

Application filed February 28, 1920. Serial No. 361,925.

*To all whom it may concern:*

Be it known that I, ROBERT D. HUGHES, a citizen of the United States, residing at Lynchburg, in the county of Campbell and State of Virginia, have invented a new and useful Tool for Handling Demountable Rims, of which the following is a specification.

This invention relates to devices for handling demountable rims.

The object is to provide a device of this character which may be adjusted to fit rims of different diameters and easily applied to opposite sides of a split demountable rim of an automobile or similar tire for the purpose of contracting the same to free it from engagement with the tire, such device being operated by the simple movement of a lever to cause a pair of hooks engaging the rims at opposite sides to approach each other and to free the rim from the tire in a well-known manner.

Another object is to provide such a device composed of few parts and capable of being stowed away in the tool box of an automobile or in some other place to occupy small space, by the simple removal of a single bolt.

An additional object is to provide a tool capable of expanding the rim to effect mounting of a tire thereon.

A further object is to provide means in such a device whereby when the necessary pressure has been brought to bear to contract the rim the actuating lever may be locked under tension, and the two hands of the operator may be used to further free the tire from the rim which is often necessary.

A full and complete understanding of the invention may be obtained from a consideration of the following detailed description taken in connection with the accompanying drawing forming part of this specification, with the understanding, however, that the invention is not confined to any strict conformity with the showing of the drawing, but may be changed and modified, so long as such changes and modifications mark no material departure from the salient features of the invention as expressed in the appended claims.

In the drawing, in which similar reference characters designate corresponding parts throughout the several figures, Figure 1 is a plan view of a portion of a demountable rim and tire and showing the improved device in position to remove the said rim;

Figure 2 is a vertical section through the same and showing the device in side elevation;

Figure 3 is a longitudinal sectional view.

Figure 4 is a transverse sectional view.

Figure 5 is a perspective view of the device disassembled and ready for stowing away.

The improved demountable rim removing tool comprises two relatively slidable members equipped, at their outer terminals, with hooked-shaped extensions for engagement with the opposite sides of a split rim. The members are adapted to be forcibly brought together by means of an internal laterally disposed lever, pivotally mounted upon one of the members, and having an arcuate, toothed head engaging with teeth formed on the inner portion of the other slidable member, whereby, when the lever is appropriately actuated, the two members having the hooks are relatively moved in opposite directions.

The member 1 comprises a housing which may be formed of some suitable heavy gage sheet metal, shaped to form parallel side walls 2, integrally joined together by a bottom wall 3 which extends from end to end of the side walls, said ends being open. Adjacent to one end, each side wall 2 is provided with an up-standing apertured ear 4, arranged opposite each other and having the apertures in alinement, and at the opposite or outer end, each side wall is formed into a hook-shaped extension 5, overhanging the ends of the side walls. The latter are reduced forming abutments 6, the said hook-shaped extensions being provided with downwardly extending lips 7 which are adapted to engage the flange of the rim 8 by slightly depressing the adjacent portion of the tire 9, as clearly illustrated in Figure 2 of the drawing. The inner walls of the lips 7 are slightly inclined as shown to fit beneath the flange of the rim and prevent slipping out of engagement therewith and the reduced ends or abutments 6 of the side walls 2 of the housing 1 are adapted, when the lips 7 are engaged with the rim, to lie close to the inner face of said rim, as shown in Figure 2. When the pressure is outward, as in expanding the rim, the abutments contact with the rim.

An upper wall 10 is provided in the housing, and is preferably composed of an angularly bent strip of sheet metal, of thinner gage than the housing proper, being secured in place by suitable rivets and in spaced relation to the bottom wall 3, the said upper wall extending from the apertured ears to the inner portion of the hooks 5.

A coacting bar 11, of substantially equal length to the housing 1, formed of some suitable metal of a thickness equal to the distance between the side walls 2 of the housing, and of a width substantially equal to the distance between the upper and lower walls thereof, is adapted to be reciprocated back and forth therein.

This bar 11 is provided with a series of teeth 12 extending from the inner end thereof throughout the major portion of its length, and is provided at the outer end, with a hook-shaped extension 13 having a downwardly and inwardly directed lip 14 and a reduced abutting end or abutment 15, of precisely the same size and contour as the corresponding members of the housing 1.

An actuating lever 16 of a length substantially equal to the length of the housing 1 and of the bar 11 is provided at one end with an arcuate head 17 having teeth 18 formed around its periphery, and provided with a central aperture which is adapted to be alined with the apertures in the ears 4, when the lever is placed in position between the ears, with the teeth 18 in engagement with the teeth 12 of the bar 11. A pivotal bolt 19 is inserted in the alined apertures to hold the lever in position.

When it is desired to remove a rim from a tire, the bar 11 is pulled out of the housing 1 a sufficient distance to bring the respective hooks 5 and 13 to a position for engaging over the flange of the rim 8, when the actuating lever 16 will be in the full line position shown in Figure 3 of the drawing. It will be seen that by rocking the said lever about the pivot 19 to assume the position indicated in dotted lines in said figure, the hooks will be caused to approach each other and will bring the sides of the rim closer to each other thereby freeing the latter from its engagement with the tire 9, it being understood that either the hooks 5 or the hook 13 is to be applied to the rim 8 adjacent to the split 8ª thereof, so that the abutting ends of the rim will permit of their separation.

After the lever has been actuated sufficiently to free one end of the split rim the desired distance, a pin 20 may be inserted between the teeth 18 where coinciding with the upper edges of the side walls 2 of the housing, at the base of the ears 4, and act to prevent any retrograde movement of the lever, thus enabling the operator to use both hands in completing the removal of the rim from the tire. This is made possible owing to the fact that the toothed head is greater in diameter than the width of the ears and projects beyond the same.

The pin 20 may be attached to the housing adjacent to one of the ears 4 by a short length of wire or chain, as indicated at 21, (Fig. 5) where the same will always be in position to be applied to the teeth 18 in the manner described. A nail or any other similar article would be equally effective.

In expanding the rim when assembling a tire therewith, the reverse movement of the lever will take place, and in such event the abutments 6 and 15 will contact with the inner face of the rim for producing the necessary expansion.

It will be seen that by removing the bolt 19 and raising the lever 16, the bar 11 may be inserted further into the housing and the head and bolt replaced, when the device is adjusted for use upon smaller rims or vice versa, though for all practical purposes, the swing of the lever and the actuation of the bar 11, through the engagement of the teeth 18 and 12, is sufficient to cause enough movement of the slidable parts for use upon various sized rims, the limit of movement of the lever in one direction causing the hooks to separate a maximum distance and the limit of movement of the lever in the other direction causing the hooks to approach each other a maximum distance.

By removing the bolt 19, the parts may be separated, as shown in Figure 5 of the drawing, the lever being placed at one side of the housing and the bar 11 being reversed and slid into the housing from the other end, the hook 13 matching with the hooks 5 and thus forming a compact bundle for stowing away. The handle of the lever forms a convenient means by which the device may be lifted when applying the device to or removing it from a rim.

From the foregoing it will be seen that a simple, easily manufactured, and powerful rim removing device has been provided, which may be easily applied and operated to expand or contract the rim of a tire, and then locked in such position, and which may be easily disassembled for stowing away to occupy a minimum amount of space.

What is claimed is:

1. A rim handling tool comprising an elongated housing having rim-engaging means at one end, an elongated bar projecting from the other end of the housing and adapted to slide therein, said bar having rim-engaging means at its outer end and rack teeth along its upper edge, and an actuating lever pivotally mounted on the housing at the end remote from the rim engaging means and having a toothed head engaging with the teeth of the bar, whereby when the lever is rocked, the housing and bar are reciprocated to move their rim-engaging means nearer to or farther away from each other.

2. A rim handling tool comprising an elongated housing open at each end and having a bottom and two side walls, and a pair of hooks rising from the side walls and spaced from each other, an elongated bar substantially coextensive in length with the housing and slidably mounted therein and having rack teeth along its upper edge and a single hook at one end, and a hand-operated lever pivotally mounted on the housing at the end remote from the hooks and having a toothed head in mesh with the rack, the pivot of said lever being detachable, whereby the lever may be disconnected from the housing, the bar reversed in position and inserted in the housing with the three hooks in alinement, and the lever placed alongside the housing so that the parts are arranged in a small space.

3. A rim handling tool comprising an elongated housing rim-engaging means at one end, an elongated bar projecting from the other end of the housing and adapted to slide therein, said bar having rim-engaging means at its outer end and rack teeth along its upper edge, a pair of apertured ears rising from the housing at the end remote from the rim-engaging means, an actuating lever placed between the ears, a removable pivot passed through the apertures of the ears for pivoting the lever thereto, an arcuate toothed head provided on the inner end of said lever for engaging with the rack teeth, said head having its teeth projecting beyond each side of the ears, whereby a locking element may be placed against the ears and across the top of the housing to engage with the teeth of the arcuate head and hold the lever in adjusted position.

In testimony, that I claim the foregoing as my own, I have hereto affixed my signature in the presence of two witnesses.

ROBERT D. HUGHES.

Witnesses:
J. B. DANOY,
H. B. RINEHART.